(12) United States Patent
Luo (10) Patent No.: US 12,398,714 B2
(45) Date of Patent: Aug. 26, 2025

(54) AIR PUMP DEVICE WITH ACCESSORIES STORAGE FUNCTION

(71) Applicant: Huaxin (Dongguan) Technology Co., Ltd., Dongguan (CN)

(72) Inventor: Renlan Luo, Dongguan (CN)

(73) Assignee: Huaxin (Dongguan) Technology Co., Ltd., Dongguan (CN)

( * ) Notice: Subject to any disclaimer, the term of this patent is extended or adjusted under 35 U.S.C. 154(b) by 0 days.

(21) Appl. No.: 19/026,347

(22) Filed: Jan. 16, 2025

(65) Prior Publication Data
US 2025/0154943 A1    May 15, 2025

(30) Foreign Application Priority Data

Jan. 14, 2025 (CN) .......................... 202520086793.7

(51) Int. Cl.

| | |
|---|---|
| F04B 37/10 | (2006.01) |
| F04B 9/02 | (2006.01) |
| F04B 35/00 | (2006.01) |
| F04B 35/04 | (2006.01) |
| F04B 39/00 | (2006.01) |
| F04B 39/12 | (2006.01) |
| F04B 39/14 | (2006.01) |
| F04B 53/08 | (2006.01) |
| F04D 25/06 | (2006.01) |
| H04W 4/80 | (2018.01) |

(52) U.S. Cl.
CPC ............... *F04B 37/10* (2013.01); *F04B 9/02* (2013.01); *F04B 35/00* (2013.01); *F04B 35/04* (2013.01); *F04B 39/00* (2013.01); *F04B 39/121* (2013.01); *F04B 39/127* (2013.01); *F04B 39/14* (2013.01); *F04B 53/08* (2013.01); *F04D 25/06* (2013.01); *H04W 4/80* (2018.02)

(58) Field of Classification Search
CPC .. F04B 37/10; F04B 9/02; F04B 35/00; F04B 35/04; F04B 39/00; F04B 39/121; F04B 39/127; F04B 39/14; F04B 53/08
USPC ......................................................... 417/572
See application file for complete search history.

(56) References Cited

U.S. PATENT DOCUMENTS

| | | | | |
|---|---|---|---|---|
| 4,389,166 A | * | 6/1983 | Harvey | ................... F04B 35/04 |
| | | | | D15/7 |
| 5,518,376 A | * | 5/1996 | Haraoka | ................. F04B 33/00 |
| | | | | 417/469 |
| 8,439,651 B2 | * | 5/2013 | Gilpatrick | ............... F04B 53/16 |
| | | | | 137/355.12 |

(Continued)

FOREIGN PATENT DOCUMENTS

CN           119554205 A  *  3/2025

OTHER PUBLICATIONS

Translation of CN119554025A from IP.com, Mar. 2025.*

*Primary Examiner* — Charles G Freay
(74) *Attorney, Agent, or Firm* — Murray, Ziel & Johnston; Aaron Powell (57) ABSTRACT

An air pump device with accessories storage function includes a case body, which is provided with an air pump and a storage box inside. A first opening is arranged at one end of the case body, and the storage box can slide along the first opening to the outside of the case body. The storage box is provided with a plurality of accommodation space, which are provided with air pump accessories inside. It is convenient for users to carry and use.

7 Claims, 10 Drawing Sheets

(56) References Cited

U.S. PATENT DOCUMENTS

| | | | | |
|---|---|---|---|---|
| 2005/0031458 A1* | 2/2005 | Brashears | ............. | B25H 3/006 |
| | | | | 417/313 |
| 2012/0168031 A1* | 7/2012 | Ohm | ....................... | F04B 35/04 |
| | | | | 141/95 |
| 2017/0112332 A1* | 4/2017 | Ciavarella | ............... | F04B 43/04 |
| 2023/0323870 A1* | 10/2023 | Chen | ....................... | F04B 37/10 |

\* cited by examiner

AIR PUMP DEVICE WITH ACCESSORIES STORAGE FUNCTION

CROSS-REFERENCE TO RELATED APPLICATIONS

The present invention claims the benefit of Chinese Patent Application No. 2025200867937 filed on Jan. 14, 2025, the contents of which are hereby incorporated by reference.

TECHNICAL FIELD

The present invention belongs to the technical field of air pump devices, and particularly relates to an air pump device with accessories storage function.

TECHNICAL BACKGROUND

Electric air pump devices have been widely used in the automotive, chemical, medical, outdoor entertainment and other industries. The electric air pump devices in the existing technology usually only have the air pump assembly arranged in the case body, without having a space specifically for storing air pump accessories (such as air pump connection pipes, air pump nozzles, etc.). Therefore, during use, the air pump accessories are scattered outside the case body of the air pump and are easily lost, especially small air pump accessories such as air pump nozzles. On the other hand, the air pump accessories that have not been stored will also be scattered everywhere in the operation area, which is inconvenient for users to use and carry.

INVENTION CONTENT

In order to overcome the defects of the existing technology, the present invention provides an air pump device with accessories storage function, which is convenient for users to carry and use.

The technical scheme adopted by the present invention for solving the technical problems is as follows:

An air pump device with accessories storage function includes a case body, which is provided with an air pump and a storage box inside. A first opening is arranged at one end of the case body, the storage box can slide along the first opening to the outside of the case body. The storage box is provided with a plurality of accommodation spaces, which are provided with the air pump accessories inside.

Further, a second opening is arranged at other end of the case body, and the air pump port of the air pump is exposed on an outer surface of the case body extending through the second opening.

Further, groove boards and card blocks are arranged in the plurality of accommodation spaces.

Further, the air pump device also includes a lock component and a pop-up component. The lock component is used to lock or unlock the storage box, and the pop-up component is used to provide a sliding force for the storage box.

Further, the lock component includes a lock and a first spring. One end of the first spring is fixedly installed in the case body, and other end is connected to the lock. The storage box has a lock slot, and the lock can be inserted into the lock slot.

Further, the pop-up component includes a second spring and a connection piece. The second spring is compressed and arranged between the connection piece and the storage box. The connection piece is connected to an inner wall of the case body on one opposite end of the first opening.

Further, the air pump includes an inflator, a piston, a connection rod and a motor. The output end of the motor is connected to the connection rod which is connected to the piston arranged in the inflator. The outer periphery diameter of the piston is adapted to the inner periphery diameter of the inflator.

Further, the motor includes a first output shaft and a second output shaft. The first output shaft is connected to the connection rod, and the second output shaft is connected to a fan; a portion of the case body adjacent to the fan is provided with vents.

Further, the air pump also includes a gear assembly, and the first output shaft transmits power to the connection rod through the gear assembly.

Further, the gear assembly includes a first gear, a second gear and a third gear. The first gear is connected to the first output shaft. The second gear is meshed with the first gear, and the third gear is meshed with the second gear. The connection rod is connected to the off-center position of the third gear.

The beneficial effects of the present invention:

The air pump device provided by the present invention stores multiple air pump accessories in a storage box, which is slidably arranged inside the case body. By storing and arranging the air pump accessories in a unified manner, it is possible to avoid loss of the air pump accessories and it is convenient for users to carry and use the air pump accessories. The air pump device is also provided with a lock component and a pop-up component, which make users easily push and pull the storage box, so that it can be easily switched between the storage state and the pull-out state.

DESCRIPTION OF MARKS IN FIGURES

1—case body; 2—first opening; 12—second opening; 13—vent; 14—top case; 15—bottom case; 16—slide switch; 17—first storage zone; 18—second storage zone; 19—third storage zone;

2—air pump; 20—air pump port; 21—inflator; 22—piston; 23—seal ring; 24—connection rod; 25—motor; 251—first output shaft; 252—second output shaft; 26—fan;

3—storage box; 30—accommodation space; 31—groove board; 311—card block; 32—lock slot; 33—air pump accessory;

4—battery;
5—lock component; 51—lock; 52—first spring;
6—pop-up component; 61—second spring; 62—connection piece;
7—gear assembly; 70—installment bracket; 71—first gear; 72—second gear; 73—third gear.

DETAILED DESCRIPTION OF THE EMBODIMENTS

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

The air pump device provided by the present invention stores a plurality of air pump accessories in a storage box, which is slidably arranged inside the case body. By storing and arranging the air pump accessories in a unified manner, it is possible to avoid loss of the air pump accessories and it is convenient for users to carry and use the air pump accessories.

Referring to FIGS. 1 to 9, this embodiment provides an air pump device with accessories storage function, including a case body 1 which is provided with an air pump 2 and a storage box 3 inside. A first opening 11 is arranged in the area of the case body 1 close to the end of the storage box 3, and the storage box 3 can slide along the first opening 11 to the outside of the case body 1. The storage box 3 is provided with a plurality of accommodation spaces 30, which are provided with air pump accessories inside.

Figure 5:
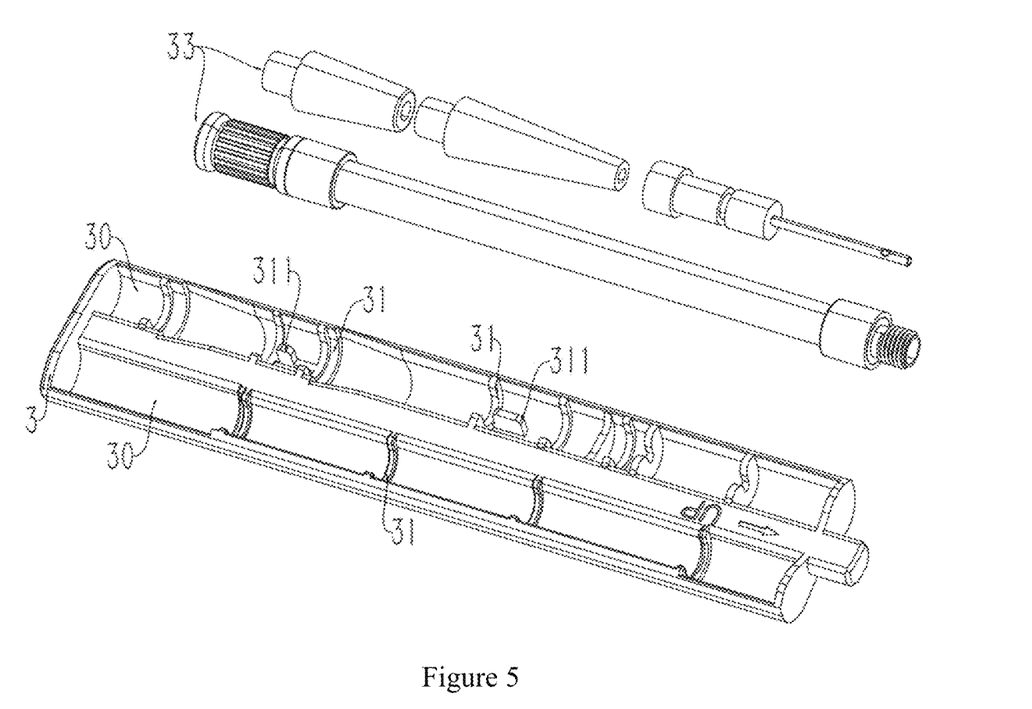
FIG. 5 is an exploded view of the storage box and the air pump accessories of the present invention.

In one embodiment, groove boards 31 and card blocks 311 are arranged in the plurality of accommodation spaces 30.

Specifically, two accommodation spaces 30 are arranged in the storage box 3. A plurality of groove boards 31 and card blocks 311 are arranged in the plurality of accommodation spaces 30. The groove boards 31 are configured as arc-shape structures for supporting the air pump accessories 33. The card blocks 311 are used to separate two adjacent air pump accessories 33.

It should be noted that, in one embodiment, the air pump 2 component can be various air pump 2 components known in the art, such as a cylinder component, a piston component, a motor driving mechanism, a gear transmission mechanism, a cooling fan, etc. The air pump accessories 33 can be various air pump accessories 33 known in the art, such as various air pump nozzles, air pump connection pipes, charging cables, etc. The air pump 2 can be matched with the air pump accessories 33 in different combinations, which can inflate different products such as balls, bicycle tires, motorcycle tires or car tires, etc.

Figure 1:
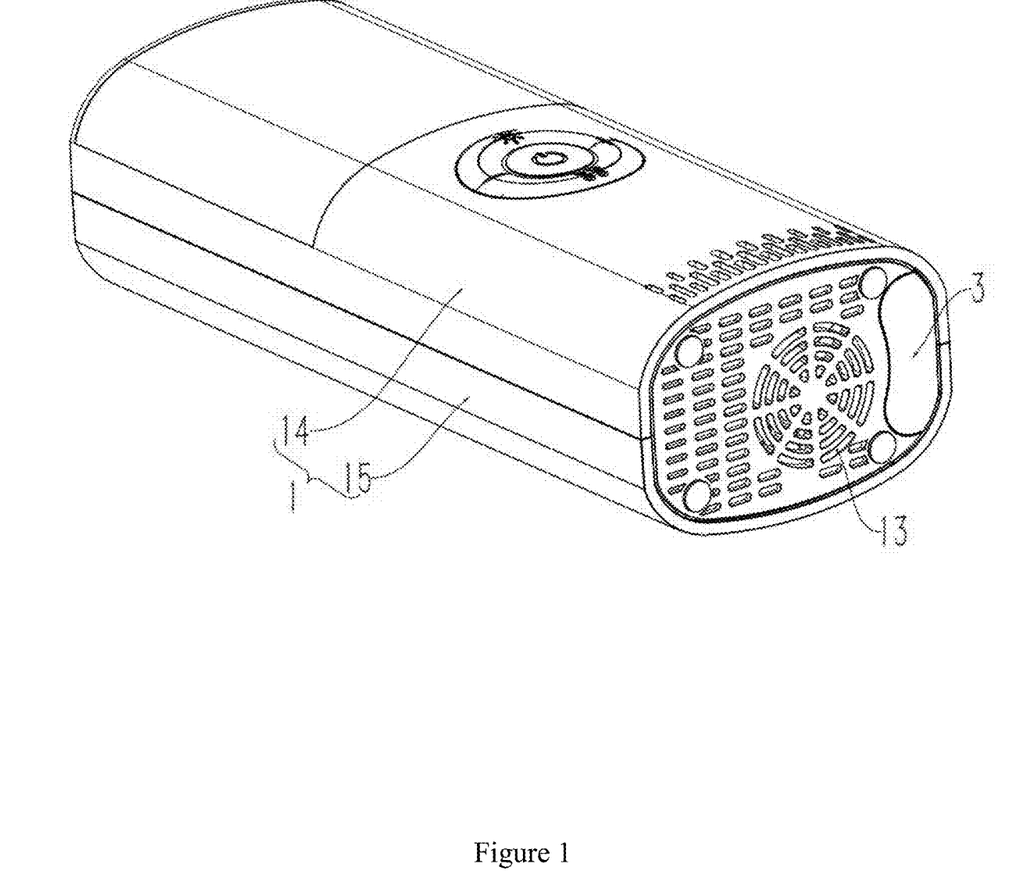
FIG. 1 is a schematic view of the air pump device of the present invention.
Figure 2:
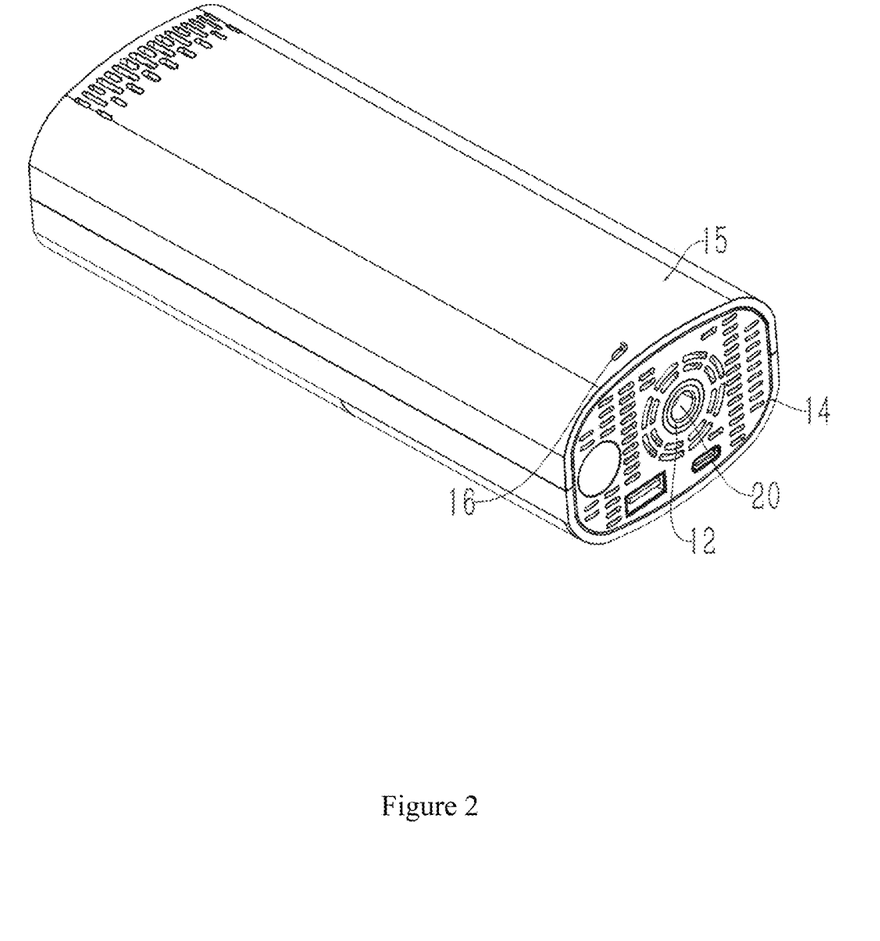
FIG. 2 is a schematic view of the air pump device of the present invention from another angle.
Figure 3:
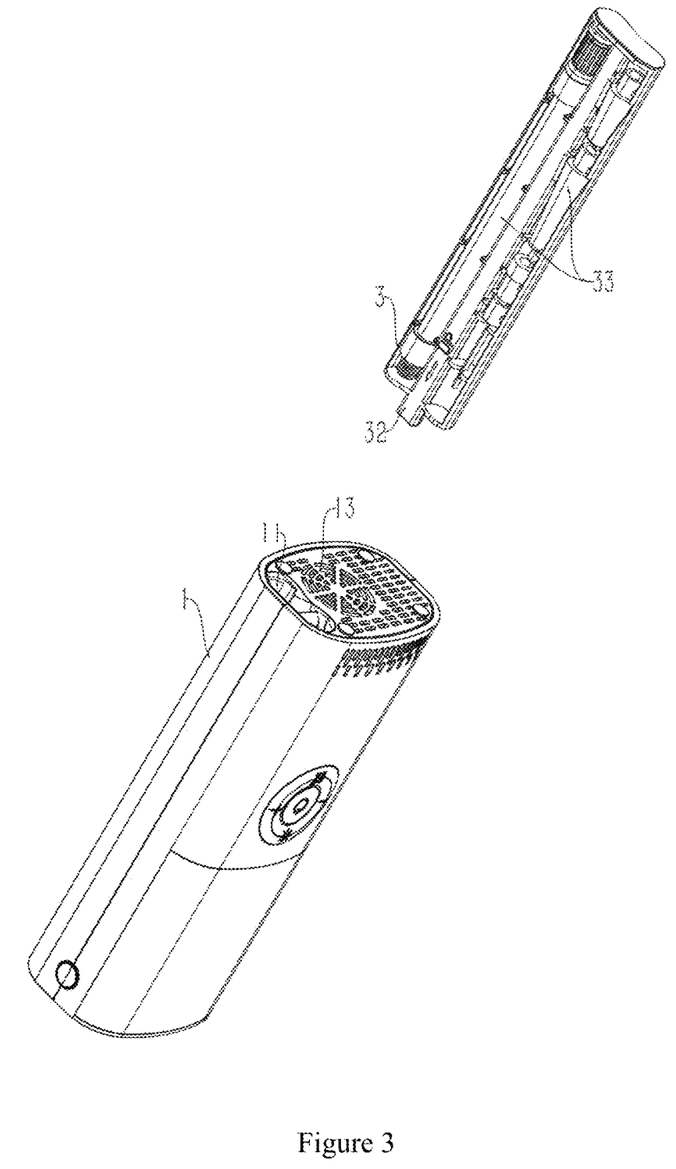
FIG. 3 is a schematic view of the storage box in the present invention in a pull-out state.

In one embodiment, other end of the case body 1 is provided with a second opening 12, and the air pump port 20 of the air pump 2 is exposed on the outer surface of the case body 1 extending through the second opening 12. When in use, users first pulls the storage box 3 out from the case body 1, and then takes out the air pump accessories 33 adapted to the product to be inflated, and finally installs the air pump accessories 33 on the air pump port 20 of the air pump 2. At this point, the preparation work of the air pump device has been completed. The product to be inflated can be inflated by only connecting the output end of the air pump accessories 33 to the air-inflating hole of the product to be inflated.

Figure 4:
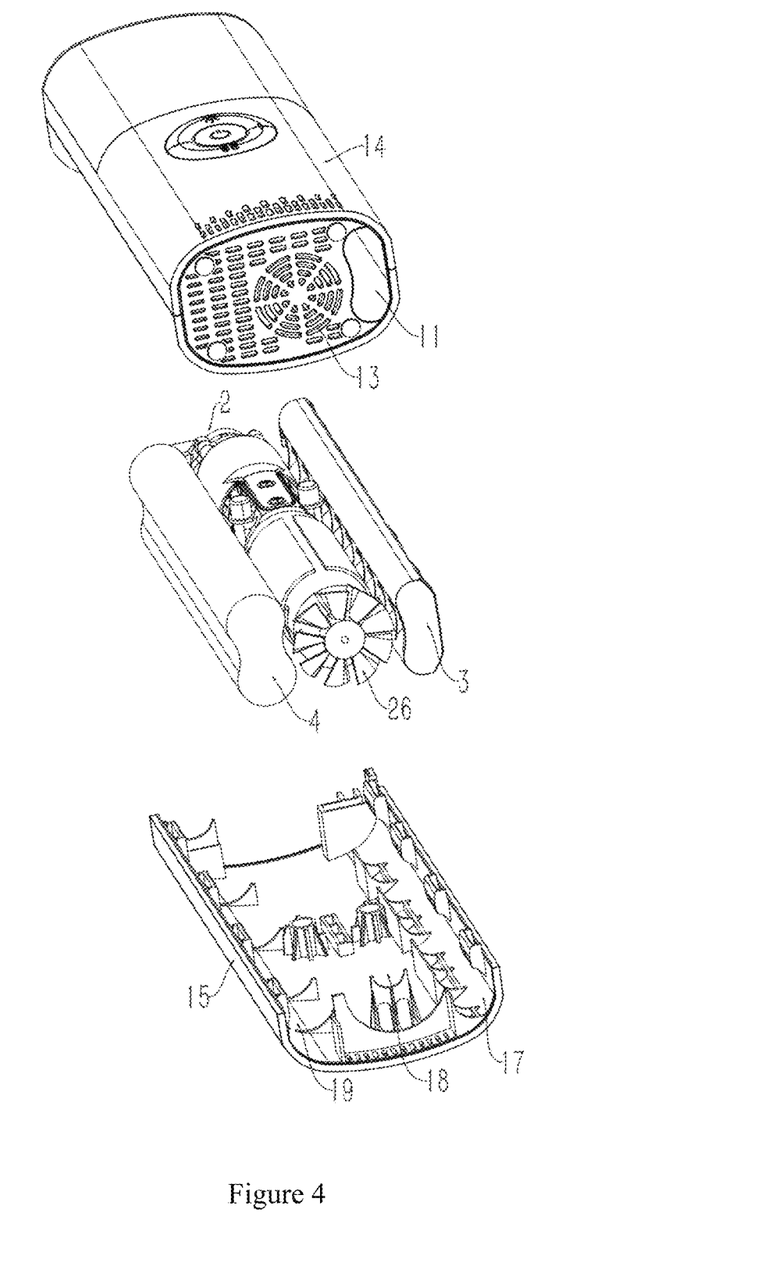
FIG. 4 is an exploded view of the air pump device of the present invention.

In one embodiment, the case body 1 includes a top case 14 and a bottom case 15. The bottom case 15 is divided into a first storage zone 17 and a second storage zone 18. The storage box 3 is arranged in the first storage zone 17, and the air pump 2 is arranged in the second storage zone 18.

Preferably, the bottom case 15 further includes a third storage zone 19, which is provided with a battery 4 inside. The battery 4 is used to provide an operation voltage for the air pump 2.

The top case 14 can cover or open the bottom case 15. When the top case 14 covers the bottom case 15, the components inside the case body 1 can be protected from collision and dust; when the top case 14 opens the bottom case 15, the first storage zone 17, the second storage zone 18 and the third storage zone 19 are exposed, which is convenient for users to repair and replace the components inside the case body 1.

Figure 9:
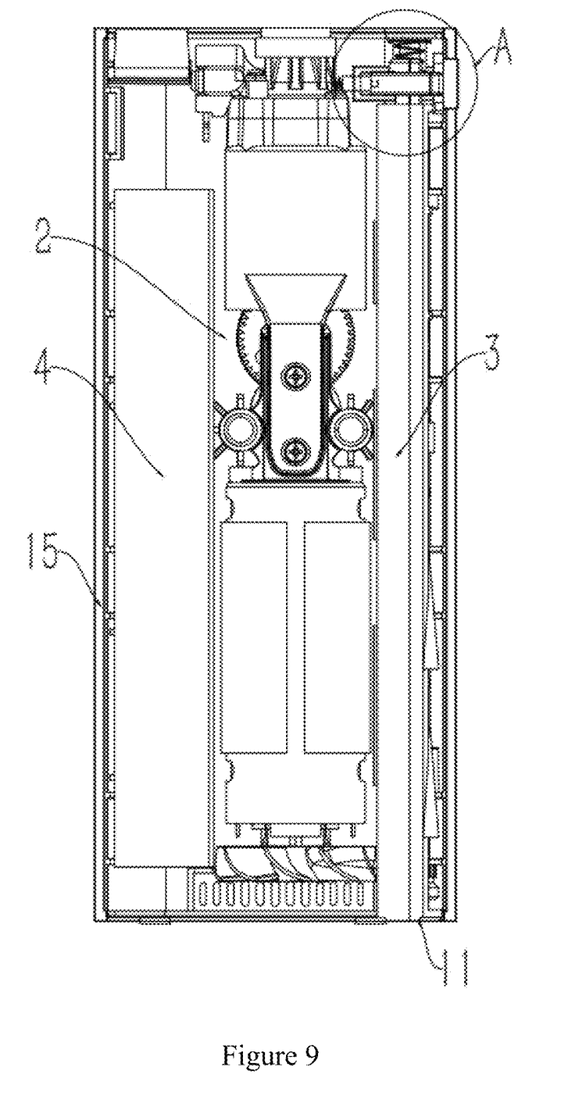
FIG. 9 is a schematic view of the air pump device of the present invention after removing a top case (top view)
Figure 10:
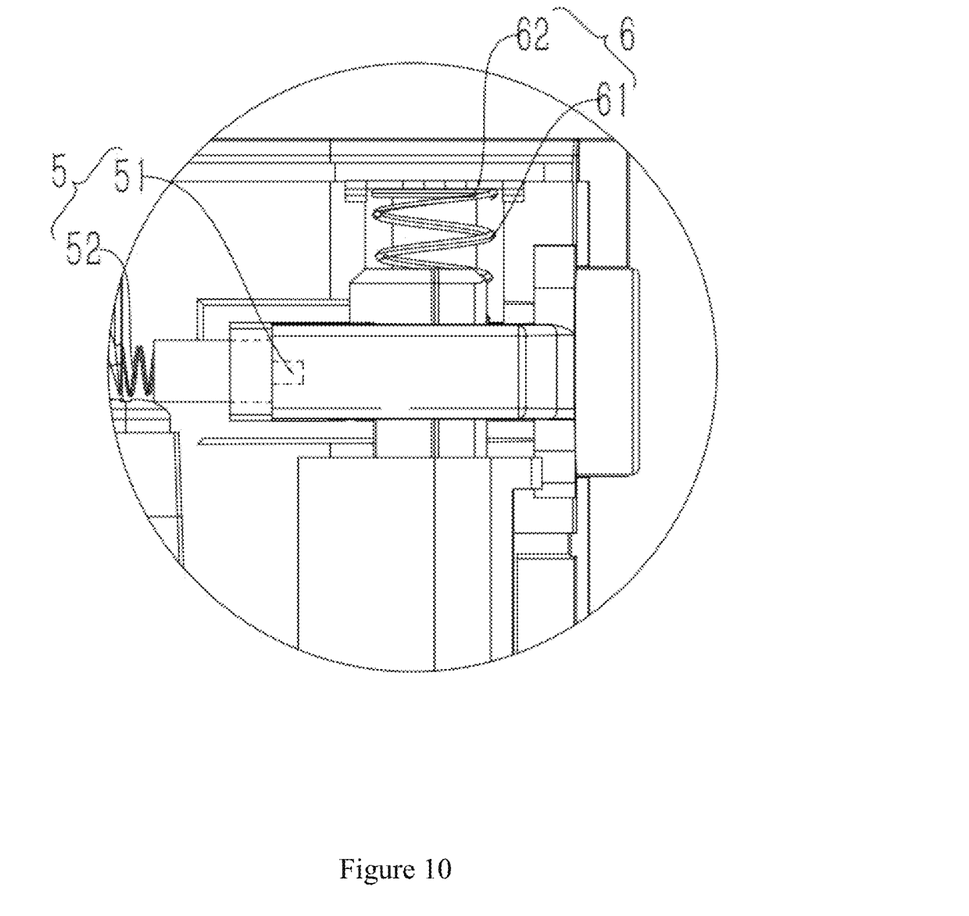
FIG. 10 is an enlarged view of point A in FIG. 8.

In one embodiment, the air pump device further includes a lock component 5 and a pop-up component 6. The lock component 5 is used to lock or unlock the storage box 3, and the pop-up component 6 is used to provide a sliding force for the storage box 3, so that the storage box 3 slides from a storage state to a pull-out state.

Preferably, the lock component 5 includes a lock 51 and a first spring 52. One end of the first spring 52 is fixedly installed in the case body 1, and other end of the first spring 52 is connected to the lock 51. The storage box 3 has a lock slot 32, and the lock 51 can be inserted into the lock slot 32. When the lock 51 is inserted into the lock slot 32, the storage box 3 is locked, and the storage box 3 cannot be pulled out from the case body 1; when the lock 51 is disengaged from the lock slot 32, the storage box 3 is unlocked, and the storage box 3 can be pulled out from the case body 1.

The pop-up component 6 includes a second spring 61 and a connection piece 62. The second spring 61 is compressed and arranged between the connection piece 62 and the storage box 3. The connection piece 62 is connected to the inner wall of the case body 1 on one opposite end of the first opening.

Understandably, one end of the second spring 61 is connected to the connection piece 62. When the storage box 3 is arranged in the first storage zone 17, the second spring 61 is in a compressed state, which can provide an elastic restoring force for the storage box 3 to be separated from the first storage zone 17. However, since the storage box 3 is restricted by the lock component 5, it cannot be pulled out from the first storage zone 17 in a locked state. Only after the lock component 5 is unlocked can the elastic restoring force act on the storage box 3 to make the storage box 3 slide out of the first storage zone 17.

Preferably, a slide switch 16 is arranged on the case body 1. One end of the slide switch 16 is exposed on the outer surface of the case body 1, and other end of the slide switch 16 extends into the interior of the case body 1 and is connected to the lock 51. Users can control the lock 51 to disengage from the lock slot 32 through the slide switch 16, so that the lock component 5 is in an unlocked state, allowing users to pull the storage box 3 out of the case body 1.

Figure 6:
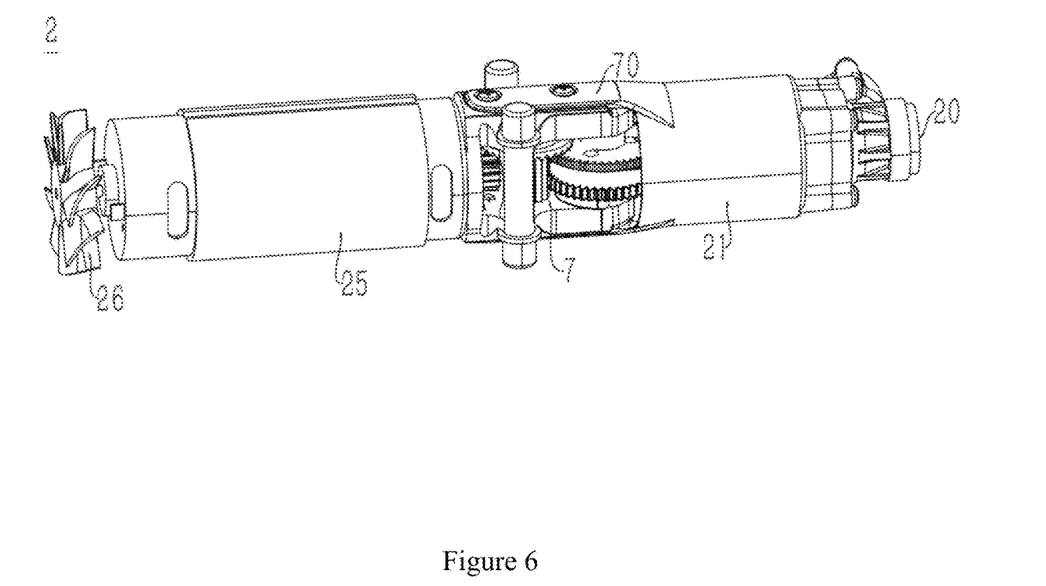
FIG. 6 is a schematic view of the air pump in the present invention.

In one embodiment, the air pump 2 includes an inflator 21, a piston 22, a connection rod 24, and a motor 25. The output end of the motor 25 is connected to the connection rod 24 which is connected to the piston 22 arranged in the inflator 21. The outer periphery diameter of the piston 22 is adapted to the inner periphery diameter of the inflator 21. The motor 25 is electrically connected to the battery 4, which provides an operation voltage for the motor 25. Under the control of the motor 25, the connection rod 24 can drive the piston 22 to move in the inflator 21.

Figure 8:
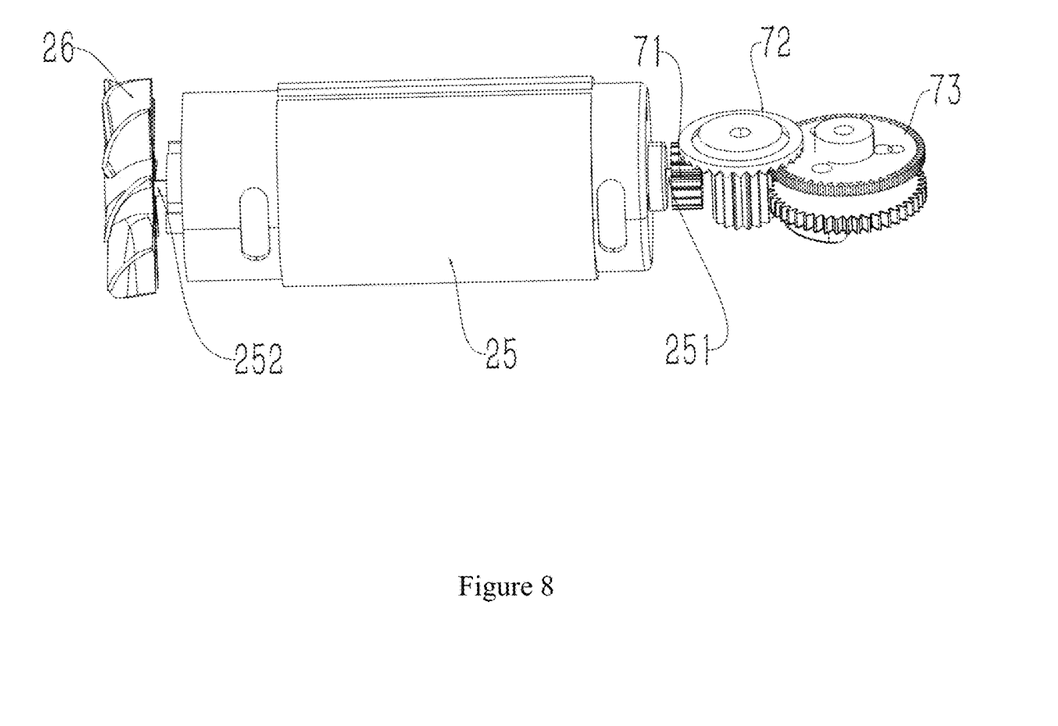
FIG. 8 is a schematic view of the connection of the motor in the present invention.

Preferably, the motor 25 adopts a dual-shaft motor. Specifically, the motor 25 includes a first output shaft 251 and a second output shaft 252. The first output shaft 251 is connected to the connection rod 24, and the second output shaft 251 is connected to a fan 26; a portion of the case body 1 adjacent to the fan 26 is provided with vents 13.

By controlling the forward and reverse rotation of the motor 25, the connection rod 24 and the piston 22 can be reciprocated inside the inflator 21 to inflate. In addition, the air pump 2 generates heat when working, but the motor 25 can drive the fan 26 to rotate to discharge the hot air generated inside the case body through the vents 13, avoiding the working process of the air pump 2 being affected by the excessively high ambient temperature.

Figure 7:
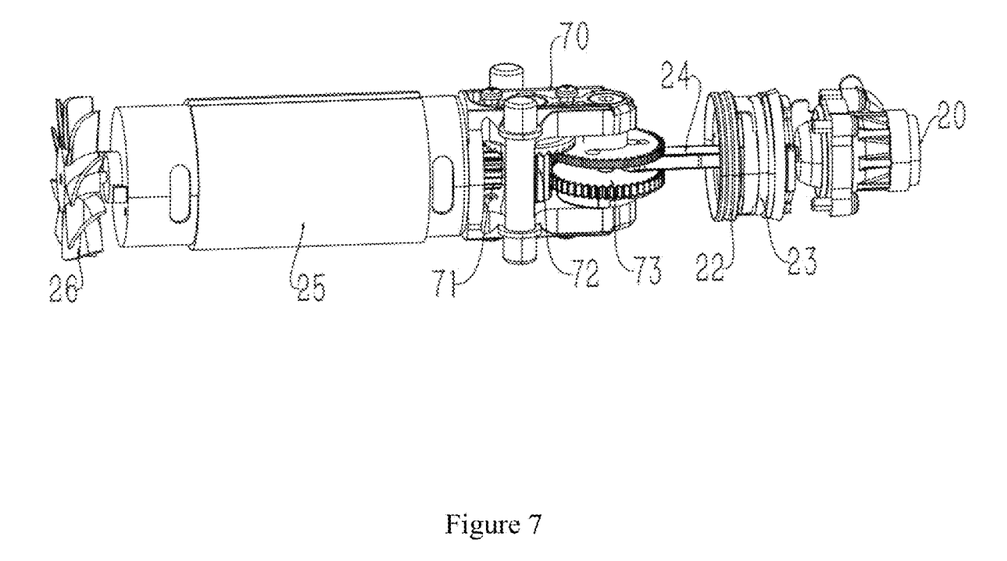
FIG. 7 is a schematic view of a partial structure of the air pump in the present invention.

Further, the first output shaft 251 transmits power to the connection rod 24 through the gear assembly 7.

Specifically, the gear assembly 7 includes a first gear 71, a second gear 72 and a third gear 73. The first gear 71 is connected to the first output shaft 251 of the motor 25. The second gear 72 is meshed with the first gear 71, the third gear 73 is meshed with the second gear 72. The connection rod 24 is connected to the off-center position of the third gear 73.

Preferably, the air pump 2 further includes an installment bracket 70, and the second gear 72 and the third gear 73 are rotatably arranged on the installment bracket 70.

When the first output shaft 251 of the motor 25 drives the first gear 71 to rotate, it can synchronously drive the second gear 72 and the third gear 73 to rotate. When the third gear 73 rotates, it will drive the connection rod 24 to reciprocate in the horizontal direction to inflate.

Further, a seal ring 23 is arranged between the outer periphery of the piston 22 and an inner wall of the inflator 21 to ensure that the gas can be effectively compressed and discharged along the air pump port 20 of the air pump 2.

In summary, the air pump device provided in this embodiment can store multiple air pump accessories 33 into the storage box 3 slidably arranged inside the case body 1, which can facilitate users to access the air pump accessories 33. At the same time, the air pump accessories 33 can be stored and organized in a unified manner to avoid the loss of the air pump accessories 33.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

What is claimed is:

1. An air pump device with an accessories storage function comprises a case body, wherein an air pump and a storage box are arranged inside the case body; a first opening is arranged at one end of the case body, the storage box can slide along the first opening; the storage box is provided with a plurality of accommodation spaces, which are provided with air pump accessories inside; and
   a second opening is arranged at an end of the case body opposite from the first opening; wherein an air pump port of the air pump is exposed on an outer surface of the case body extending through the second opening.

2. The air pump device with an accessories storage function according to claim 1, wherein groove boards and card blocks are arranged in the plurality of accommodation spaces.

3. The air pump device with an accessories storage function according to claim 1, wherein the air pump device also comprises a lock component and a pop-up component; the lock component comprises a lock and a first spring; one end of the first spring is fixedly installed in the case body, and an other end of the first spring is connected to the lock; the storage box has a lock slot, and the lock can be inserted into the lock slot; and the pop-up component comprises a second spring and a connection piece; the second spring is compressed and arranged between the connection piece and the storage box; the connection piece is connected to an inner wall of the case body on the end of the case body opposite from the first opening.

4. The air pump device with an accessories storage function according to claim 1, wherein the air pump comprises an inflator, a piston, a connection rod and a motor; an output end of the motor is connected to the connection rod which is connected to the piston arranged in the inflator; an outer periphery diameter of the piston is adapted to an inner periphery diameter of the inflator.

5. The air pump device with an accessories storage function according to claim 4, wherein the motor comprises a first output shaft and a second output shaft; the first output shaft is connected to the connection rod, and the second output shaft is connected to a fan; a portion of the case body adjacent to the fan is provided with vents.

6. The air pump device with an accessories storage function according to claim 4, wherein the air pump further comprises a gear assembly; the first output shaft transmits power to the connection rod through the gear assembly.

7. The air pump device with an accessories storage function according to claim 6, wherein the gear assembly comprises a first gear, a second gear and a third gear; the first gear is connected to the first output shaft; the second gear is meshed with the first gear, the third gear is meshed with the second gear; the connection rod is connected to an off-center position of the third gear.

\* \* \* \* \*